United States Patent Office 3,642,880
Patented Feb. 15, 1972

3,642,880
NOVEL POLYFLUOROSULFONATE SALTS
Richard F. Sweeney, Randolph Township, Morris County, and Alson K. Price, Mine Hill, N.J., assignors to Allied Chemical Corporation, New York, N.Y.
No Drawing. Filed Mar. 24, 1966, Ser. No. 536,981
Int. Cl. C07c 143/00
U.S. Cl. 260—503
18 Claims

ABSTRACT OF THE DISCLOSURE

Compounds of the formula:

$$Q\text{---}O\text{---}R\text{---}SO_3M$$

wherein

M represents an alkali metal atom;
R represents a divalent radical such that the oxygen and sulphur atoms are linked by a chain of three or four carbon atoms which are joined to each other by single bonds or by bonds forming part of an aromatic ring and each of whose remaining valencies is satisfied by a hydrogen or halogen atom, an alkoxy radical or an unsubstituted, alkoxy-substituted or halogen substituted hydrocarbyl radical or by a divalent unsubstituted, alkoxy-substituted or halogen-substituted hydrocarblene radical which also satisfies another of the said remaining valencies; and
Q represents a saturated radical consisting of carbon, hydrogen and fluorine atoms and containing at least three fluorine atoms in which the carbon atom linked to the oxygen atom is not linked to a fluorine atom, may be prepared by reacting an alkali metal salt of a polyfluoro alcohol with an appropriate sultone. These compounds are useful as surface active agents, as intermediates in the preparation of textile treating agents and in the preparation of modifiers for plastic materials.

---

This invention relates to novel polyfluorinated sulfonate salts useful as surface active agents and as intermediates in the preparation of textile treating agents and in the preparation of modifiers for plastic materials.

The novel compounds of the invention may be described by the formula:

$$Q\text{---}O\text{---}R\text{---}SO_3M$$

wherein

M represents an alkali metal atom;
R represents a divalent radical such that the oxygen and sulphur atoms are linked by a chain of three or four carbon atoms which are joined to each other by single bonds or by bonds forming part of an aromatic ring and each of whose remaining valencies is satisfied by a hydrogen or halogen atom, an alkoxy radical or an unsubstituted, alkoxy-substituted or halogen substituted hydrocarbyl radical or by a divalent unsubstituted, alkoxy-substituted or halogen-substituted hydrocarblene radical which also satisfies another of the said remaining valencies; and
Q represents a saturated radical consisting of carbon, hydrogen and fluorine atoms and containing at least three fluorine atoms in which the carbon atom linked to the oxygen atom is not linked to a fluorine atom.

A preferred class of compounds may be described by the formula:

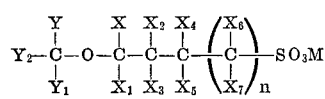

wherein any of X—$X_7$ may be hydrogen, halogen, or a halogenated or non-halogenated member selected from the group consisting of alkyl, alkenyl, alkoxy, alkoxyalkyl, aryl, alkoxyaryl, aralkyl and alkaryl radicals, said X—$X_7$ groups being the same or different and may be taken singly or jointly and when taken jointly form, together with some or all of the carbon atoms in the main chain to which the X—$X_7$ groups are attached, a cycloaliphatic group; any Y—$Y_2$ may be a member selected from the group consisting of methyl, H or a $CF_3(CF_2)_p(CH_2)_m$— group wherein $m$ is 0–15 and $p$ is 0–15, said Y—$Y_2$ groups being the same or different and may be taken singly or jointly and when taken jointly form, together with the central carbon atom to which the Y—$Y_2$ groups are attached, a cycloaliphatic group, provided that when any of the Y—$Y_2$ groups is a $CF_3(CF_2)_p(CH_2)_m$— group in which $m$ is 1 or more, the remaining Y—$Y_2$ groups are H. further provided that the Y—$Y_2$ groups contain a combined total of at least three fluorine atoms and one hydrogen atom; wherein M is an alkali metal and wherein $n$ may be 0 or 1.

It has been found that compounds embraced by the above formula wherein $p$ is 5–15, exhibit particularly good surface activity. This is attributed to the long fluorocarbon tail which is provided under such circumstances. In order to maximize the beneficial effects provided by such a fluorocarbon tail, the chain containing the fluorocarbon tail should not be unduly extended by $CH_2$— groups. Generally, there should be at least one $CF_3$— or $CF_2$— group for each $CH_2$— or $CH_3$— group in the fluorocarbon tail portion of the molecule. A preferred class of compounds within the scope of the invention, are those in which not only $p$ is 5–15, but in which at the same time, $m$ is 0–5.

In those embodiments wherein the Y—$Y_2$ groups, in some combination, form a cycloaliphatic moiety, e.g., a 1—hydroperfluorinated cycloalkyl group, the preferred total cyclic carbon content of such moiety is between 4–6 carbon atoms inclusive.

For reasons of availability of starting materials and ease of preparation, a preferred embodiment of the invention is represented by those compounds in the above formula wherein X—$X_7$ are all hydrogen atoms. Otherwise, the nature of the X—$X_7$ substituents is not critical. Illustrative specific substituents which may be employed include the following: fluoro, chloro, bromo, methyl, ethyl, hexyl, vinyl, allyl, 2,3-dimethylbuten-2-yl, methoxy, hexoxy, 2-methylpropoxy, benzyl, phenyl, xylyl, tolyl, 2-chlorovinyl, 3-bromobutadienyl, β-chloronaphthyl, perchlorocyclohexyl, cyclopentyl, 2-ethoxyethyl, dimethoxyphenylene, vinylphenyl, 2-ethoxyallyl, camphanyl and methylcyclohexenyl. In those embodiments wherein the X—$X_7$ groups are other than hydrogen, the carbon content of the X-$X_7$ substituents is not critical because in no case will the carbon bridge between the oxygen and sulfur atoms exceed four. Thus, the surfactant properties of the resulting molecules are not substantially affected by the carbon content of the X—$X_7$ substituents. For reasons of availability and ease of preparation, however, these substituents are preferably halogen, e.g. fluorine, chlorine or bromine; a lower aliphatic group containing from one to about six carbon atoms; or an aryl group containing from about 6–10 carbon atoms. In those embodiments wherein the X—$X_7$ substituents are taken together and form a cycloaliphatic group e.g., a saturated cyclic or aromatic hydrocarbon group, with some or all of the carbon atoms in the main chain, such group may contain like substituents as described by X—$X_7$ and the preferred total carbon content, including those carbon atoms utilized in the main chain, is from 4–14 inclusive and preferably from 6–10 inclusive.

Those compounds wherein M is Na generally exhibit high surface activity and possess the additional advantage of being cheaper to make than any of the other compounds contemplated wherein M may be another alkali metal and accordingly the sodium salts constitute a preferred embodiment of the invention.

The novel compounds of the invention, hereafter referred to as sulfonate salts, may be prepared by reacting an alkali metal salt of a polyfluoroalcohol having the formula:

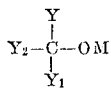

wherein Y—Y$_2$ and M are as defined above, with a sultone of the formula:

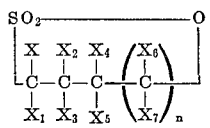

wherein X—X$_7$ and $n$ are as defined above. The reaction is preferably carried out in the presence of an inert organic solvent. The solvent should be one in which both of the reactants are reasonably soluble and includes such materials as ethers, e.g. ethyl ether; the parent alcohols of the alkali metal salt reactants; aromatic solvents, such as benzene, toluene, xylene and the like; and also any of the well known higher molecular weight ethereal solvents, such as tetrahydrofuran, dioxane or diglyme.

The temperature at which the reaction is carried out is not critical. Sufficiently moderate temperatures should be employed, however, in order to promote favorable reaction rates. With relatively low boiling solvents, i.e. those boiling below about 100° C., e.g. ethyl ether, reflux temperatures have been found to be quite suitable. Preferably, however, reaction temperatures should not be permitted to exceed about 100° C.

The reaction is conveniently and preferably carried out at atmospheric pressure although sub- or superatmospheric pressures may be employed without any particular advantage.

Product recovery is simple and conventional. The unreacted volatile starting materials and the solvent may be removed by simple evaporation or by distillation leaving a solid residue which comprises the sought-for sulfonate salt of the invention. Further purification may be accomplished by washing with an ether, such as ethyl ether, and recrystallizing from a suitable solvent, such as isopropanol.

The alkali metal salt reactant, hereafter referred to as metal alkoxide, may be prepared by reacting an alkali metal, e.g., K, Na, Li, Rb and Cs, with a polyfluoroalcohol having the formula:

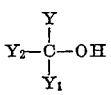

wherein Y—Y$_2$ are as defined above. The reaction is preferably carried out in the presence of an inert organic solvent, such as described above for use in the main reaction between the metal alkoxide and the sultone. The metal alkoxide may be isolated and purified before carrying out the main reaction with the sultone reactant; however, it has been found that good yields of the sought-for sulfonate salt products may be obtained by simply adding the sultone reactant to the impure ethereal solution of the metal alkoxide, followed by heating the resulting mixture as described heretofore.

The polyfluoroalcohol precursors for the metal alkoxide reactants are, with the exception of the class of 1-hydroperfluorocycloalkanols, known compounds and are either commercially available or may be prepared by conventional methods. 1-hydroperfluorocycloalkanols may be prepared by reducing the corresponding perfluorocycloalkanones with sodium borohydride, as is described in more detail in co-pending, commonly assigned application of Louis G. Anello and Richard F. Sweeney, Ser. No. 424,827, filed Jan. 11, 1965, now Pat. No. 3,350,464.

The sultone starting materials are also a known class of compounds and all species embraced by the above given formula are either commercially available or are capable of being prepared by known techniques.

The following illustrate the invention. Parts and percentages are by weight unless otherwise indicated.

EXAMPLE 1

1.6 g. (0.07 g.-at.) of sodium metal were added in small pieces to a stirred solution of 11.7 g. (0.07 mole) of hexafluoroisopropanol in 100 ml. of ethyl ether. The resulting mixture was heated overnight at reflux temperature, at the end of which period the unreacted sodium metal (0.06 g.) was removed from the solution by physical means. Next, a total of 8.55 g. (0.07 mole) of propanesultone was added to the solution and the resulting reaction mixture was heated, with stirring, to reflux. Reflux temperature was maintained for a period of about 24 hours. During this period the volume of the reaction mixture was maintained at a constant level by addition of ethyl ether to compensate for loss through evaporation. At the end of the 24 hour period the ethyl ether solvent and the unreacted alcohol were removed by evaporation. The residual solid was then washed with ethyl ether leaving 21 g. (96 mole percent yield) of a crude product which was then purified by recrystallization from isopropanol. The purified product was a whitish powdery material and had a melting point of 200° C. It was soluble in methyl alcohol, ethyl alcohol and water and was insoluble in benzene and ethyl ether. The product was identified as sodium 3-(2-hydrohexafluoroisopropoxy)propanesulfonate.

Analysis.—Calculated for C$_6$H$_7$SO$_4$F$_6$Na (percent): C, 23.1; H, 2.25; F, 36.5; S, 10.4. Found (percent): C, 23.09; H, 2.13; F, 36.5; S, 10.39.

EXAMPLE 2

The procedure described in Example 1 was repeated with the following exceptions: 12.2 g. (0.1 mole) of propanesultone were added to a mixture which was prepared by refluxing 10.0 g. (0.1 mole) of trifluoroethanol with 2.4 g. (0.1 g.-at.) of sodium metal in 100 ml. of ethyl ether. After several hours of refluxing with the sultone reactant, the product mixture was worked up as described in Example 1 to give 24.5 g. (100 mole percent yield) of a product identified as sodium 3-(1,1-dihydrotrifluoroethoxy)propanesulfonate (M.P. 249° C.). The product exhibited the same solubility characteristics as shown by the product of Example 1.

Analysis.—Calculated for C$_5$H$_8$SO$_4$F$_3$Na (percent): C, 24.5; H, 3.27; S, 13.1; F, 23.3. Found (percent): C, 24.29; H, 3.8; S, 11.8; F, 22.8.

EXAMPLE 3

The procedure described in Example 1 was repeated with the following exceptions: 3.05 g. (0.025 mole) of propanesultone were added to a mixture which was prepared by refluxing 10 g. (0.025 mole) of 1,1-dihydropentadecafluorooctanol with 0.6 g. (0.026 g.-at.) of sodium metal in 100 ml. of ethyl ether. After about 24 hours of refluxing with the sultone reactant, the product mixture was evaporated in a rotary evaporator to yield 13 g. (94 mole percent) of a product identified as sodium 3 - (1,1-dihydropentadecafluorooctyloxy)propanesulfonate (M.P. 207° C.).

EXAMPLE 4

The procedure described in Example 1 was repeated with the following exceptions: 6.1 g. (0.05 mole) of propanesultone were added to a mixture which was prepared by refluxing 14 g. (0.05 mole) of 1-hydrodecafluorocyclohexanol with 1.15 g. (0.05 g.-at.) of sodium metal in 100 ml. of ethyl ether. After refluxing with the sultone reactant, the product mixture was worked up as described in Example 1 to give 12 g. (57 mole percent yield) of a product identified as sodium 3-(1hydrodecafluorocyclohexyloxy)propanesulfonate.

*Analysis.*—Calculated for $C_9H_7SO_4NaF$ (percent): C, 25.4; H, 1.65; S, 7.54; F, 44.7. Found (percent) C. 24.27; H, 1.77; S, 6.51; F, 42.12.

EXAMPLE 5

The procedure described in Example 1 was repeated with the following exceptions: 3.4 g. (0.025 mole) of 1,4-butanesultone were added to a mixture which was prepared by refluxing 1,1-dihydropentadecafluorooctanol with 0.6 g. (0.026 g.-at.) of sodium metal in 100 ml. of ethyl ether. After about 16 hours of refluxing with the sultone reactant, the product mixture was worked up to give 13.0 g. (93 mole percent yield) of the crude product. An analytical sample, M.P. 142–145° C., was obtained by recrystallization from isopropanol. The product was identified as sodium 4-(1,1-dihydropentadecafluorooctyloxy)butanesulfonate.

*Analysis.*—Calculated for $C_{12}H_{10}SO_4F_{15}Na$ (percent): C, 25.8; H, 1.8; S, 5.85; F, 51.0. Found (percent): C, 25.8; H, 1.62; S, 5.25; F, 50.27.

The infrared spectrum of the product exhibited an envelope of bands at approximately 7.8–9.0 microns and a band at about 9.45 microns, corresponding to the C—F and sulfonate functions respectively, thus confirming identification of the product.

EXAMPLE 6

The procedure described in Example 1 was repeated with the following exceptions: 2.7 g. (0.02 mole) of 1,4-butanesultone were added to a mixture which was prepared by refluxing 5.6 g. (0.02 mole) of 1-hydrodecafluorocyclohexanol with 0.92 g. (0.04 g.-at.) of sodium metal in 100 ml. of ethyl ether. After about 12 hours of refluxing with the sultone reactant, the product mixture was worked up to give 2 g. (23 mole percent yield) of crude product. An analytical sample, M.P. 173–175° C., was obtained by recrystallization from isopropanol. The product was identified as being sodium 4-(1-hydrodecafluorocyclohexyloxy)butanesulfonate.

*Analysis.*—Calculated for $C_{10}H_9SO_4F_{10}Na$ (percent): C, 27.4; H, 2.06; S, 7.31; F, 43.3. Found (percent): C, 26.84; H, 1.59; S, 7.29; F, 41.7.

EXAMPLES 7–24

The procedure described in Example 1 is repeated employing equivalent amounts of various sultone and metal alkoxide reactants to get the corresponding sulfonate salts, as shown in the following table:

TABLE I

| Example | Metal alkoxide reactant | Sultone reactant | Sulfonate salt product |
|---|---|---|---|
| 7 | $CF_3-CF_2-\underset{CH_3}{\overset{CH_3}{C}}-OK$ | naphtho-sultone (O—SO₂ fused to naphthalene) | $CF_3-CF_2-\underset{CH_3}{\overset{CH_3}{C}}-O-$naphthyl$-SO_3K$ |
| 8 | $CF_3(CF_2)_5(CH_2)_6-OK$ | benzo-fused sultone ($SO_2$—O—$CH_2$ on benzene) | $CF_3(CF_2)_5(CH_2)_6-O-CH_2-$phenyl$-SO_3K$ |
| 9 | $F_2C-\overset{H}{C}-ORb$ / $F_2C-CF_2$ (perfluorocyclic) | dimethyl-cyclohexyl sultone structure | $H_3C-CH$  $HC-CH_3$ ring with $F_2C-\overset{H}{C}-O-CH_2-CH_2-CH_2-CH-SO_3Rb$ / $F_2C-CF_2$ |
| 10 | $F_2C-CCH_2CH_2-OCs$ with F and $CF_2$ bridge ($C_4F_7$ ring) | $CH_3(CH_2)_4CH$ with $CH_2CH_2$ / O—$SO_2$ | $F_2C-\overset{F}{C}CH_2CH_2-O-\overset{(CH_2)_4}{\overset{|}{CH}}CH_2CH_2-SO_3Cs$ with $CF_2$ ring |
| 11 | $CF_3$ / $(CH_2)_4$ / $CH_2$ / $H-C-OLi$ / $(CF_2)_3$ / $CF_3$ | norbornane sultone with Br and $C_2H_5$ (O—$O_2S$) | $CF_3$ / $(CH_2)_4$ / $CH_2$ / $H-C-O$ — norbornyl with Br, $C_2H_5$, $SO_3Li$ |
| 12 | $CF_3(CF_2)_{15}(CH_2)_6-ONa$ | cyclic $SO_2$—O—CH—$CH_2$—$CH_2$—CH—$CH_2$ | $CF_3(CF_2)_{15}(CH_2)_6-O-CH-CH_2-CH_2-CH-SO_3Na$ with $CH_2$ bridge |
| 13 | $CF_3(CF_2)_5CH_2-ONa$ | cyclic $SO_2$—O—CH—$CH_2$—$CH_2$—CH— with CH—$C_6H_5$ | $CF_3(CF_2)_5CH_2-O-CH-CH_2-CH_2-CH-SO_3Na$ with CH—$C_6H_5$ bridge |

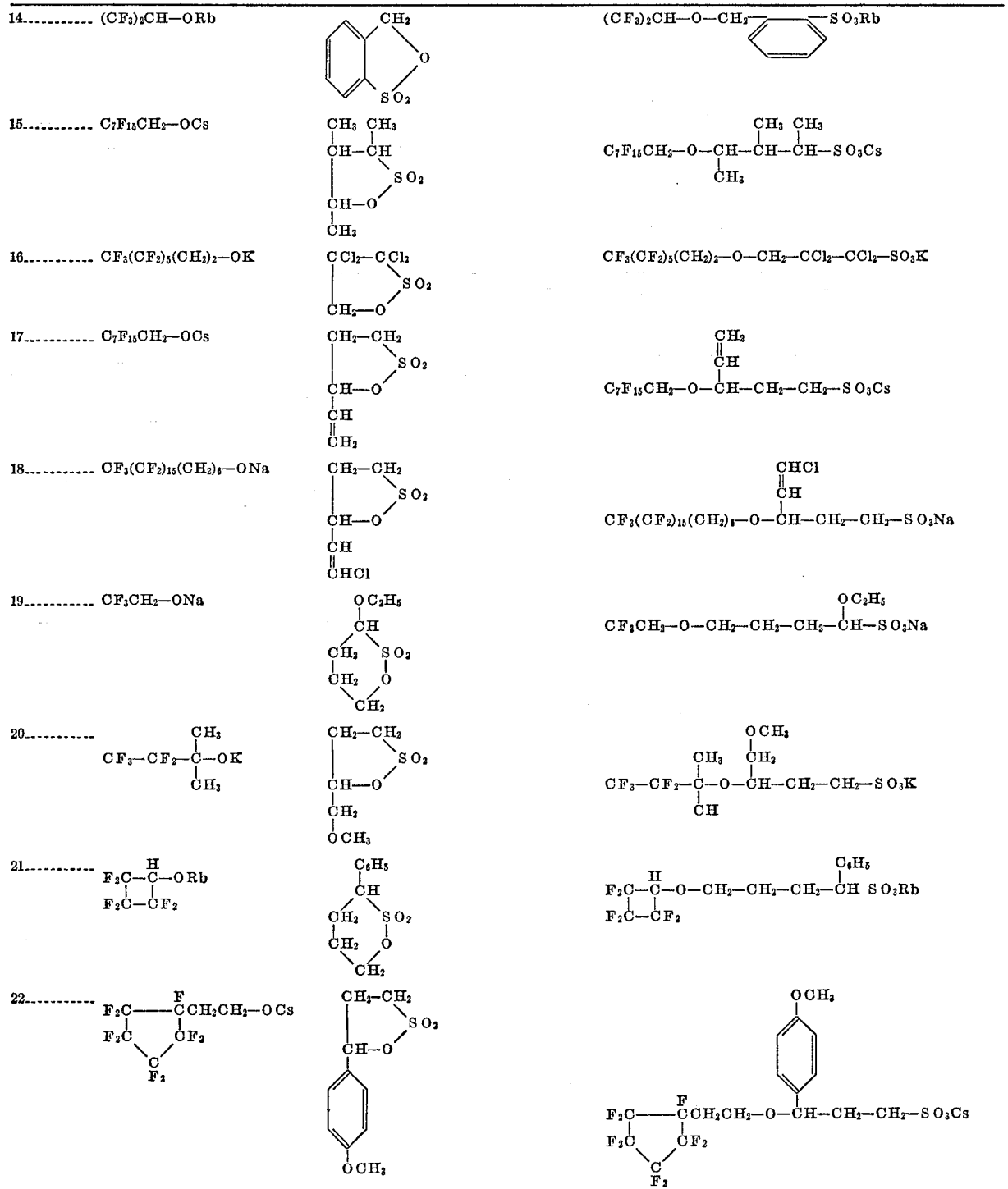

The sulfonate salts of the invention exhibit excellent surface activity and may be used as anti-wetting agents and as emulsifying agent, by conventional techniques. The following table shows the surface tensions of illustrative sulfonate salts of the invention in 1% concentrations in water. Surface tensions were measured with a Dunouy Tensiometer at about 25° C. These are to be compared with the surface tension of water at 25° C. which is 72 (dynes/cm.).

TABLE I

| Sulfonate salt: | Surface tension (dynes/cm.) |
|---|---|
| Sodium 3-(1,1-dihydrotrifluoroethoxy)propanesulfonate | 66.8 |
| Sodium 3-(2-hydrohexafluoroisopropoxy)propanesulfonate | 55.8 |
| Sodium 3 - (1 - hydrodecafluorocyclohexyloxy) propanesulfonate | 33.3 |

TABLE I.—Continued

| Sulfate salt: | Surface tension (dynes/cm.) |
|---|---|
| Sodium 3 - (1,1 - dihydropentadecafluorooctyloxy)propanesulfonate | 18.7 |
| Sodium 4 - (1-hydrodecafluorocyclohexyloxy)butanesulfonate | 21.0 |
| Sodium 4 - (1,1 - dihydropentadecafluorooctyloxy)butanesulfonate | 21.0 |

It is to be understood that whereas the above description has been made with particular reference to specific embodiments, such embodiments are to be taken as illustrative only and the invention is to be limited only by the scope of the appended claims.

We claim:

1. Compounds of the formula:

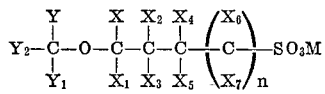

wherein any of $X$—$X_7$ taken singly, are hydrogen, or a member selected from the group consisting of alkyl, alkenyl, alkoxy, alkoxyalkyl, aryl, alkoxyaryl, aralkyl and alkaryl radicals, said $X$—$X_7$ groups being the same or different or taken jointly form, together with some or all of the carbon atoms in the main chain to which the $X$—$X_7$ groups are attached, a saturated cyclic or aromatic hydrocarbon group; any of $Y$—$Y_2$ taken singly, are selected from the group consisting of methyl, H, and $CF_3(CF_2)_p(CH_2)_m$— groups wherein $m$ is 0–15 and $p$ is 0–15, said $Y$—$Y_2$ groups being the same or different or taken jointly, form, together with the central carbon atom to which the $Y$—$Y_2$ groups are attached, a 1-hydroperfluorinated cycloalkyl group of 4 to 6 carbon atoms, provided that when any of the $Y$—$Y_2$ groups is a $$CF_3(CF_2)_p(CH_2)_m—$$

group in which $m$ is 1 or more, the remaining $Y$—$Y_2$ groups are H, further provided that the $Y$—$Y_2$ groups contain a combined total of at least three fluorine atoms and one hydrogen atom, wherein M is an alkali metal and wherein $n$ may be 0 to 1.

2. Compounds according to claim 1 in which at least one of $Y$—$Y_2$ is a $CF_3(CF_2)_p(CH_2)_m$— group in which $p$ is 5–15 inclusive.

3. Compounds according to claim 1 in which at least one of $Y$—$Y_2$ is a $CW_3(CF_2)_p(CH_2)_m$— group in which $m$ is 0–5 inclusive.

4. Compounds according to claim 1 which M is Na or K.

5. Compounds according to claim 1 in which $X$—$X_7$ are all hydrogen.

6. Compounds according to claim 5 in which at least one of $Y$—$Y_2$ is a $CF_3(CF_2)_p(CH_2)_m$— group in which $p$ is 5–15 inclusive.

7. Compounds according to claim 5 in which at least one of $Y$—$Y_2$ is a $CF_3(CF_2)_p(CH_2)_m$— group in which $m$ is 0–5 inclusive.

8. Compounds according to claim 5 in which $n$ is 0.

9. Compounds according to claim 5 in which $n$ is 1.

10. Compounds according to claim 5 in which M is Na or K.

11. Compounds according to claim 5 in which M is Na or K, in which Y and $Y_1$ are both hydrogen and in which $Y_2$ is a $CF_3(CF_2)_p(CH_2)_m$— group in which $p$ is 0–15 and in which $m$ is no greater than $p$.

12. Compounds according to claim 5 in which the $Y$—$Y_2$ groups are taken together and form a 1-hydroperfluorinated cycloalkyl group with the central carbon atom to which they are attached.

13. A compound according to claim 5 which is sodium 3-(2-hydrohexafluoroisopropoxy)propanesulfonate.

14. A compound according to claim 1 which is sodium 3-(1,1-dihydrotrifluoroethoxy)propanesulfonate.

15. A compound according to claim 1 which is sodium 3-(1,1-dihydropentadecafluorooctyloxy)propanesulfonate.

16. A compound according to claim 1 which is sodium 3-(1-hydrodecafluorocyclohexyloxy)propanesulfonate.

17. A compound according to claim 1 which is sodium 4-(1,1-dihydropentadecafluorooctyloxy)butanesulfonate.

18. A compound according to claim 1 which is sodium 4-(1-hydrodecafluorocyclohexyloxy)butanesulfonate.

References Cited

UNITED STATES PATENTS

| 2,732,398 | 1/1956 | Brice et al. | 260—503 |

FOREIGN PATENTS

| 1,363,500 | 5/1964 | France | 260—513 |

OTHER REFERENCES

J. H. Helberger et al.: Organic Sulfonic Acids, Annalen, vol. 586, pp. 147–157 (1954).

BERNARD HELFIN, Primary Examiner

L. De CRESCENTE, Assistant Examiner

U.S. Cl. X.R.

252—353; 260—505 R, 512 R, 513 R

UNITED STATES PATENT OFFICE
CERTIFICATE OF CORRECTION

Patent No. 3,642,880        Dated Feb. 15, 1972

Inventor(s) Richard F. Sweeney, Alson K. Price

It is certified that error appears in the above-identified patent and that said Letters Patent are hereby corrected as shown below:

Column 2, line 8, after "any" insert --of--.

Column 5, line 1, "3-(1hydrodecafluorocyclo-" should be -- 3-(1-hydrodecafluorocyclo- --.

Table I, Example 1, under "Sulfonate salt product"; that part of the formula reading:

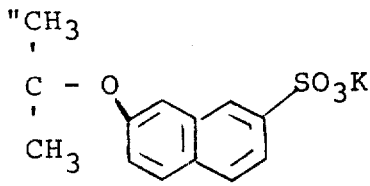

should read

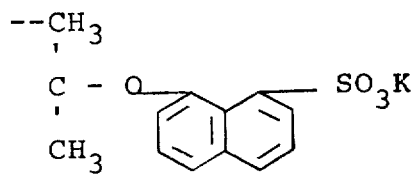

UNITED STATES PATENT OFFICE
CERTIFICATE OF CORRECTION

PO-1050
(5/69)

Patent No. 3,642,880     Dated Feb. 15, 1972

Inventor(s) Richard F. Sweeney, Alson K. Price

It is certified that error appears in the above-identified patent and that said Letters Patent are hereby corrected as shown below:

Claim 1, in the formula; that part reading:

$$"\begin{array}{c} X_6 \\ -C- \\ X_7 \end{array}"$$

should read $$--\begin{array}{c} X_6 \\ -C- \\ X_7 \end{array}--.$$

Claim 3, line 2, in the formula, "$CW_3$" should read --$CF_3$--.

Claim 4, line 1, after "1" insert --in--.

Signed and sealed this 10th day of April 1973.

(SEAL)
Attest:

EDWARD M. FLETCHER, JR.
Attesting Officer

ROBERT GOTTSCHALK
Commissioner of Patents